May 29, 1923.

C. RATELLE 1,456,829

TIRE PROTECTOR

Filed Aug. 24, 1922

Inventor:
CLARENCE RATELLE,
By W. J. FitzGerald & Co.
Attorney.

May 29, 1923.
C. RATELLE
TIRE PROTECTOR
Filed Aug. 24, 1922 2 Sheets-Sheet 2
1,456,829
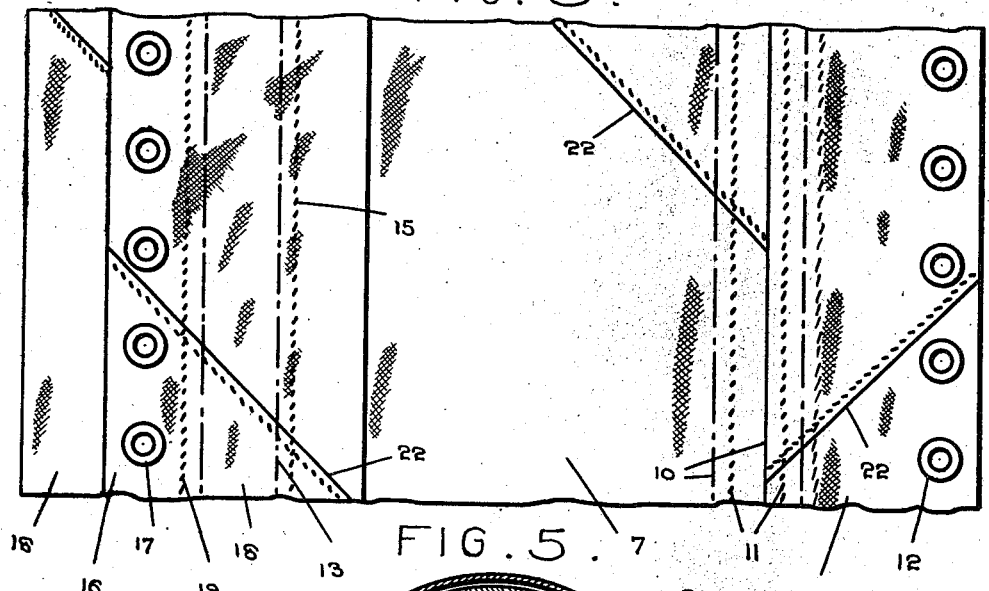
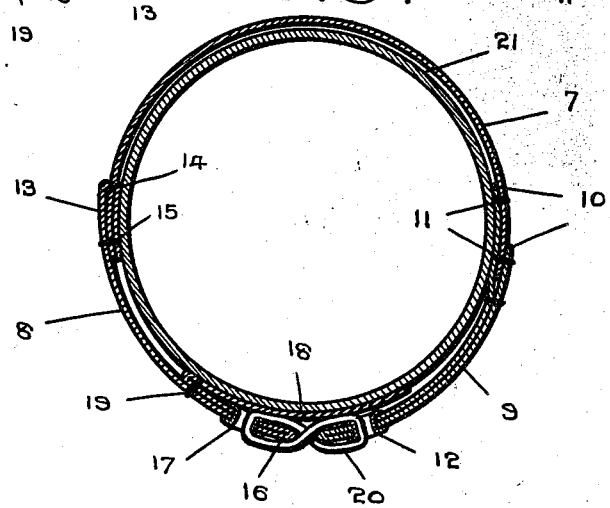
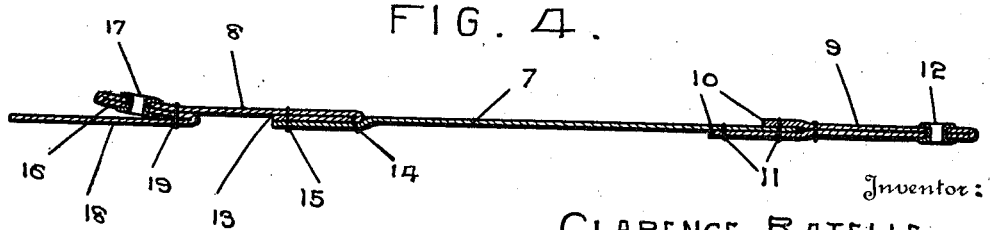
Inventor:
CLARENCE RATELLE,
By W. J. FitzGerald & Co.
Attorney.

Patented May 29, 1923.

1,456,829

UNITED STATES PATENT OFFICE.

CLARENCE RATELLE, OF LOS ANGELES, CALIFORNIA.

TIRE PROTECTOR.

Application filed August 24, 1922. Serial No. 584,029.

*To all whom it may concern:*

Be it known that I, CLARENCE RATELLE, a citizen of the United States, residing at Los Angeles, in the county of Los Angeles and State of California, have invented certain new and useful Improvements in Tire Protectors; and I do hereby declare the following to be a full, clear, and exact description of the invention, such as will enable others skilled in the art to which it appertains to make and use the same.

The present invention relates to tire protectors, and aims to provide a novel and improved protective jacket for the inner tube of a pneumatic tire having several points of utility and advantage.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Fig. 3 is a fragmentary plan view of the protector laid flat.

Fig. 4 is a cross section of the protector laid flat.

Fig. 5 is a cross section of the protector on the inner tube.

Figure 1:
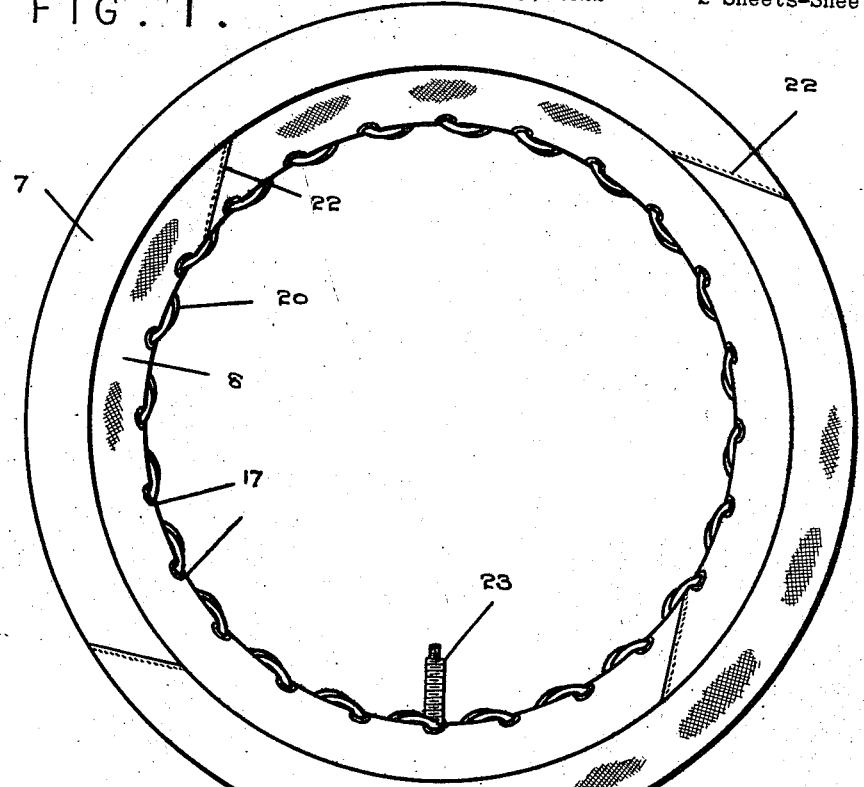
Figure 1 is a side elevation of the protector enclosing the inner tube.
Figure 2:
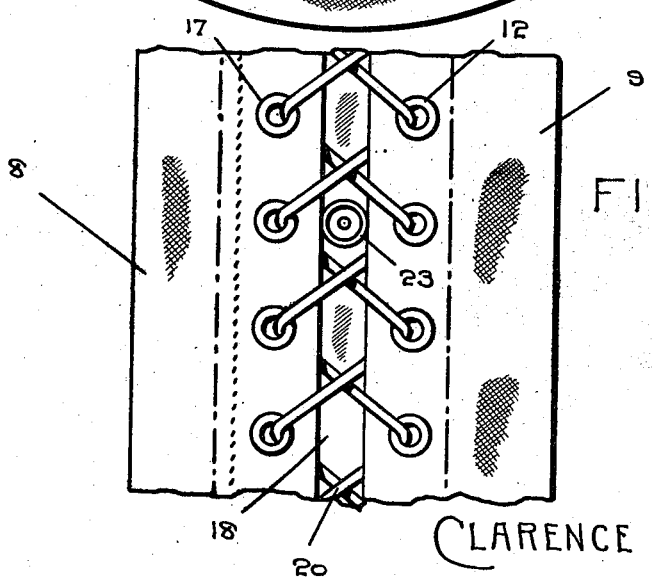
Fig. 2 is an enlarged fragmentary view of the inner periphery of the protector.

The protector is composed of canvas or other suitable pliant fabric, and three parallel strips of fabric are used, disposed side by side, and cut on the bias, with the threads or strands running diagonally or obliquely in opposite directions. The protector is composed of the intermediate strip 7 and side strips 8 and 9, and by cutting the material on the bias, such strips will more readily conform to the longitudinal and transverse curvature of the inner tube, the threads or strands being readily distorted slightly, so that the strips will be curved longitudinally and transversely to occupy the space between the inner tube and casing of a pneumatic tire.

The strip 9 is doubled on a longitudinal line with its edge portions overlapping the opposite sides of one edge portion of the strip 7, and the edge portions of the strip 9 overlap the strip 7 different widths, as seen in Fig. 4, and the edge portions of the strips 7 and 9 are secured together by longitudinal rows or lines of stitches 11. The strip 9 is thus of double thickness, with the bend or fold disposed away from the strip 7, and eyelets 12 are clinched through the strip 9 along the bend or fold thereof constituting one edge portion of the protector.

The strip 8 is attached to the strip 7 in a different manner, that edge portion of the strip 8 adjacent to the strip 7 being bent back inwardly, as at 13, and the bent back portion 13 is sewed by a line of stitches 14 to the strip 7 adjacent to the bend or fold, and another row of stitches 15 fastens the edge portion of the strip 7, portion 13 and body portion of the strip 8 securely together, making a secure seam between the strips 7 and 8.

The strip 8 has a double fold between its edges forming the doubled portion 16 through which eyelets 17 are clinched, and a line of stitches 19 fastens the folded portions of the material together inwardly of the eyelets 17 along the inner bend or fold, leaving the portion 16 free, and forming the flap 18 behind the eyelets 17 projecting beyond the portion 16.

The eyelets 12 and 17 are for the reception of a lacing 20, although other means for connecting the edge portions of the protector can be used in place of the eyelets and lacing, and it will be noted that the eyelets are engaged through double thicknesses of the protector along the edges thereof, with the material doubled or folded at the edges of the protector along which the eyelets are disposed.

When the protector is placed around the inner tube 21 of a pneumatic tire, as shown in Fig. 5, the strip 9 overlaps the flap 18, whereby said flap is disposed behind the edge portions of the protector, to prevent the lacing and eyelets from chafing or injuring the inner tube, and to prevent the inner tube from bulging or blowing out between the edges of the protector when the inner tube is inflated.

The strips 7, 8 and 9 may be composed of single lengths of material, or of several sections of pieces disposed end to end. At any rate, the end seams 22 of the strips are disposed on the bias, or disposed obliquely or diagonally the same as the threads or strands. Even though the strips are cut straight, they will readily conform to the shape of the inner tube, the bias cut of the material enabling the material to shape itself to the tire.

The valve stem 23 of the inner tube extends through the flap 18 between the edge portions of the protector, and the protector thus completely jackets and encloses the inner tube, and the protector has a permanent attached flap 18 eliminating the use of the ordinary flap used in pneumatic tires.

The protector will relieve the inner tube from any injurious strain, and will also avoid the pinching of the tube, either between the beads of the casing, or in a cut or slit in the casing. The protector also acts as a cushion between the inner tube and casing to prevent the tube sticking to the casing as well as preventing the tube blowing or bulging out of the casing. The casing is also protected against excessive pressure from the inflated tube, and the air pressure in the tire is kept practically normal even when the tire is used on a hot day or on heated pavement. The protector also prevents dirt and grit from coming into contact with the inner tube, and the inner tube is preserved and will have a longer life. The protector eliminates the trouble frequently encountered with the use of ordinary flaps which not infrequently shift out of position or become folded or buckled, thereby frequently ruining the inner tube. The protector also enables weak outer casings to be used, which would ordinarily result in blowouts, and the casing can be used much longer by the protection afforded.

Having thus described the invention, what is claimed as new is:—

1. A protector to surround the inner tube of a pneumatic tire composed of an intermediate strip and two side strips, the intermediate strip being wider than the side strips and said strips having seams to be disposed at the opposite sides of the tire, each strip being of fabric cut on the bias with the threads or strands extending obliquely, and means for connecting the side strips together, one side strip having a flap to overlap the other between said means and the inner tube.

2. A protector for the inner tube of a pneumatic tire composed of fabric, and having a double fold near one edge providing a doubled portion and a flap behind said portion and projecting beyond said portion to be overlapped by the opposite edge portion of the protector, securing elements engaged through said doubled portion, the double portions of the protector being secured together inwardly of said securing elements, and securing elements engaged through the last named edge portion of the protector.

3. A protector for the inner tube of a pneumatic tire comprising a plurality of strips cut on the bias with the threads or strands extending obliquely, the strip at one edge of the protector having a double fold between its edges providing a doubled portion and a flap behind said portion and projecting beyond said portion to be overlapped by the opposite edge portion of the protector, securing elements engaged through said doubled portion, the doubled portions of the first named strip being secured together inwardly of said securing elements, and securing elements engaged through the last named edge portion of the protector.

In testimony whereof I have signed my name to this specification in the presence of two subscribing witnesses.

CLARENCE RATELLE.

Witnesses:
    THOS. R. MOULD,
    CHAS. NICOLL.